(12) United States Patent
Morrison et al.

(10) Patent No.: US 7,546,847 B2
(45) Date of Patent: Jun. 16, 2009

(54) LOCKING PLUG FOR CLOSING THE SIDEWALL OF A PIPE

(75) Inventors: Phillip K. Morrison, Broken Arrow, OK (US); Eric N. Freeman, Sapulpa, OK (US); Mark A. Morgan, Tulsa, OK (US); Tony R. Garrison, Bixby, OK (US)

(73) Assignee: TDW Delaware, Inc., Wilmington, DE (US)

( * ) Notice: Subject to any disclaimer, the term of this patent is extended or adjusted under 35 U.S.C. 154(b) by 563 days.

(21) Appl. No.: 11/431,215

(22) Filed: May 10, 2006

(65) Prior Publication Data

US 2006/0260687 A1  Nov. 23, 2006

Related U.S. Application Data

(63) Continuation-in-part of application No. 11/133,514, filed on May 20, 2005, now Pat. No. 7,311,114.

(51) Int. Cl.
  *F16L 55/18* (2006.01)
(52) U.S. Cl. .................... 137/317; 137/318; 138/89; 138/94
(58) Field of Classification Search ............. 137/318, 137/317, 268; 138/89, 94, 97
See application file for complete search history.

(56) References Cited

U.S. PATENT DOCUMENTS

| 408,826 A | 8/1889 | Conroy |
|---|---|---|
| 1,825,034 A | 9/1931 | Weatherhead, Jr. |
| 2,546,502 A | 3/1951 | Harrington |
| 2,563,244 A | 8/1951 | Holicer |
| 2,913,259 A | 11/1959 | Rings |
| 3,135,278 A | 6/1964 | Foord et al. |
| 3,155,116 A * | 11/1964 | Ver Nooy .............. 138/89 |
| 3,373,452 A | 3/1968 | Watts |
| 3,510,156 A | 5/1970 | Markowz |
| 3,766,947 A | 10/1973 | Osburn |

(Continued)

FOREIGN PATENT DOCUMENTS

GB   2117863 A   10/1983

OTHER PUBLICATIONS

International Search Report and Written Opinion, issued Mar. 27, 2008 by the International Searching Authority (ISA/US); 13 pages.

*Primary Examiner*—Kevin L Lee
(74) *Attorney, Agent, or Firm*—Gable Gotwals (57) ABSTRACT

A plug for closing an opening in the sidewall of a pipe, including a base member having a radial flange portion, a tubular portion and an annular elastomeric seal member slideably received on the base member tubular portion and in engagement with the flange portion. A rigid compression member is slideably received on the base member tubular portion and in contact with the elastomeric member and has a frusto-conical circumferential surface. A plurality of rigid segmented slips are received on the compression member and have teeth for biting into the cylindrical sidewall when displaced on the frusto-conical surface. An actuation member is received on the base member tubular portion providing a surface in engagement with the segmented slips. A tightening nut can be tightened to cause the segmented slips to lock the plug in position and to sealably close the pipe cylindrical sidewall.

8 Claims, 5 Drawing Sheets

U.S. PATENT DOCUMENTS

| | | |
|---|---|---|
| 3,842,864 A | 10/1974 | Riegel et al. |
| 4,100,929 A | 7/1978 | Harrison |
| 4,401,133 A | 8/1983 | Lankston |
| 4,579,484 A | 4/1986 | Sullivan |
| 4,708,372 A | 11/1987 | Arima et al. |
| 4,880,028 A | 11/1989 | Osburn et al. |
| 5,035,266 A | 7/1991 | Benson et al. |
| 5,439,331 A | 8/1995 | Andrew et al. |
| 5,493,748 A | 2/1996 | Santo |
| 5,660,199 A | 8/1997 | Maichel |
| 5,678,865 A | 10/1997 | Anderson |
| 5,967,168 A | 10/1999 | Kitani et al. |
| 6,196,256 B1 | 3/2001 | Klampfer |
| 6,241,424 B1 | 6/2001 | Bath et al. |
| 6,361,015 B1 * | 3/2002 | Warmerdam ................... 251/5 |
| 6,769,152 B1 | 8/2004 | Crenshaw et al. |
| 6,810,903 B1 * | 11/2004 | Murphy et al. .............. 137/318 |
| 6,883,546 B1 | 4/2005 | Kobylinski |
| 7,353,839 B2 * | 4/2008 | Calkins et al. .............. 137/317 |
| 2004/0089342 A1 | 5/2004 | Vennemann et al. |
| 2007/0023096 A1 * | 2/2007 | Buckley et al. ............... 138/89 |

* cited by examiner

LOCKING PLUG FOR CLOSING THE SIDEWALL OF A PIPE

REFERENCE TO PENDING APPLICATIONS

This is a continuation-in-part of U.S. patent application Ser. No. 11/133,514, filed May 20, 2005 now U.S. Pat. No. 7,311,114 and entitled Cross-Line Plugging System. The application is not related to any federally sponsored research or development.

BACKGROUND OF THE INVENTION

I. Field of the Invention

This invention relates to a system and method of providing access to the interior of a branch pipeline, referred to as a "cross-line" that intersects with a main pipeline of equal or greater diameter.

II. Description of the Prior Art.

Pipelines are used in all parts of the world for the transportation of hydrocarbon products including primarily natural gas and crude oil. These commodities are exceedingly valuable and, in fact, indispensable to the modem standard of living enjoyed throughout the world. However, in addition to being valuable, they are also hazardous. Such hazards include danger to life as can be a consequence of explosions or fires from leaked oil or gas products and, in addition, these products can be harmful to the environment. For these reasons, it is important that pipelines be periodically inspected and/or evaluated for proper repair and maintenance. Pipelines are usually buried under the earth's surface to protect them against hazards that would exist if they were laid on the earth's surface. In addition, due to the increased amount of offshore oil and gas exploration, many pipelines today are laid at the bottom of an ocean, that is, on the ocean floor. For these reasons, the exterior surfaces of pipelines are not readily available for visual inspection. As a consequence, the most economical and effective way of inspecting pipelines is by transmitting pigs that are moved through the pipelines by fluid flow, that is, by the flow of natural gas or crude oil. For background information as to the application and use of pipeline pigs, reference may be had to an article entitled "Fundamentals of Pipeline Pigging", authored by Burt VerNooy, appearing in *Pipeline Industry*, September/October 1980, published by the Gulf Publishing Company of Houston, Tex.

A particular problem is encountered with the use of pipeline pigs for inspecting cross-lines, that is, pipelines that interconnect between other and usually, larger diameter pipelines. While primary pipelines may extend for miles or even hundreds of miles, cross-lines are typically of much shorter length, such as a few hundred feet up to a few miles. It is sometimes difficult and always expensive to install pig launching and receiving facilities for such cross-lines.

The term "cross-line" as used herein includes a pipeline that interconnects between other pipelines, as above stated, and also branch lines, that is, a smaller diameter pipeline that extends from a main pipeline that does not necessarily connect to another main pipeline but that connects such as to a storage facility, a processing plant or the like. Thus, "cross-lines" herein includes branch lines.

For additional background information relating to this invention, reference may be had to the following previously issued United States patents.

| Pat. No. | Inventor | Title |
| --- | --- | --- |
| 408,826 | Conroy | Cross For Gas Mains or Pipes |
| 1,825,034 | Weatherhead, Jr. | Sectional Pipe Coupling |
| 2,546,502 | Harrington | Means For Incorporating Solid Fat In Liquid Fatty Mixtures |
| 2,563,244 | Holicer | Fluid Control Mechanism |
| 2,913,259 | Rings | Sidebranch Fitting For Main Supply Pipe |
| 3,135,278 | Foord et al. | Loading Pipeline Pigging System and Method |
| 3,373,452 | Watts | Manifold Assembly For Hot and Cold Water Faucet Pairs Arranged Back to Back |
| 3,510,156 | Markowz | Device For Transmitting Flows |
| 3,766,947 | Osburn | Fluid Tight Closure |
| 4,579,484 | Sullivan | Underwater Tapping Machine |
| 4,708,372 | Arima et al. | Cross Piping Construction |
| 4,880,028 | Osburn et al. | Completion Machine |
| 5,439,331 | Andrew et al. | High Pressure Tapping Apparatus |
| 5,678,865 | Anderson | Tank Tee Unit |
| 5,967,168 | Kitani et al. | Method of Connecting Branch Pipe |
| 6,196,256 | Klampfer | Manifold |

BRIEF SUMMARY OF THE INVENTION

The invention herein provides methods, apparatus and systems for providing access to the interior of a cross-line that intersects with a main pipeline of equal or greater diameter. The method includes the steps of first attaching a side outlet fitting to the exterior of the main pipeline on the side thereof diametrically opposite the point of intersection of the cross-line. A side outlet may be attached by welding to the exterior of the main pipeline a saddle-type device having a portion that fits against the exterior wall of the pipeline with an integral branch fitting. After a side outlet fitting is welded to the main pipeline, a full opening valve is affixed to the outlet fitting. The typical side outlet fitting is of the type having a flange. A full open valve can be affixed to the flange fitting.

A hot tapping system is then affixed to the valve. The following two U.S. patents illustrate and describe apparatus and systems that can be used to tap a pipeline under pressure.

1. U.S. Pat. No. 4,579,484 entitled "Underwater Tapping Machine", Sullivan, issued Apr. 1, 1986;

2. U.S. Pat. No. 5,439,331 entitled "High Pressure Tapping Apparatus, Andrew et al, issued Aug. 8, 1995"

In the present case, such hot tapping system is applied to the exterior of the valve and with the valve open, the hot tapping system can extend through it to cut an opening in the sidewall of the main pipeline. While in some instances it may be necessary to cut an opening in the pipeline that is only as large as the interior diameter of the cross-line, nevertheless, for practical purposes, it is normally desirable that an opening be cut in the sidewall of the main pipeline substantially equal to its internal diameter.

After an opening is cut in the wall of the main pipeline the hot tap machine is removed and equipment can then be attached to the valve for use in inserting inspection pigs into the pipeline. As a practical step, after the hot tap machine has been employed, a pig launcher may be affixed to the valve. Thereafter, with the valve open, a pig can be launched through the valve and through the fitting attached to the main pipeline diametrically through the main pipeline and into the cross-line. Thereafter, the pig moves by fluid flow, either gas or liquid, through the cross-line to perform any of the usual services that can achieved by a pig. For instance, pigs can be employed to make geometry measurements to detect indentations, buckles or other obstructions in the pipeline. Pigs can be employed for cleaning the interior of the cross-line. Pigs can be employed for detecting corrosion in the walls of the cross-line by the use of magnetic flux leakage or sonic inspection technologies.

In addition to being able to introduce a pig into a cross-line by the methods and systems of this invention, other activities can be accomplished that do not employ a pig. For instance, by the use of locking pipe plug, the cross-line can be closed adjacent the point where it intersects the main pipeline. With the cross-line closed, pressure tests can be made. Further, by closing off the cross-line at both ends, it can be depressurized and repairs can be made to it without stopping the flow of the fluids through the main pipeline.

Cross-lines typically extend between two main pipelines. In this case it is desirable to provide access to both ends of the cross-line which is accomplished by the steps above indicated being employed on both main pipelines. That is, access can be obtained through the main pipelines into both the opposite ends of the cross-line.

The invention herein further provides an apparatus for use when inspecting, testing or repairing a cross-line after access has been provided through the main pipelines to which the cross-line attaches. A branch shield pig guide is disclosed that can be installed in a main pipeline to prevent a pig passing through the main pipeline from being inadvertently diverted into the cross-line. A flow-through pig guide is also disclosed to ensure the passage of a pig diametrically through a main pipeline and into a cross-line. Such flow-through pig guide is always removed after the pigging operation is complete through the cross-line. After access is provided to the cross-line using the concepts of the present invention, locking pipe plugs or cross-line pluggers, both of which are disclosed herein, can be employed for closing off the ends of the cross-line for reasons above described.

A better understanding of the invention will be obtained from the following detailed description of the preferred embodiments and claims, taken in conjunction with the attached drawings.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENTS

It is to be understood that the invention that is now to be described is not limited in its application to the details of the construction and arrangement of the parts illustrated in the accompanying drawings. The invention is capable of other embodiments and of being practiced or carried out in a variety of ways. The phraseology and terminology employed herein are for purposes of description and not limitation.

Elements illustrated in the drawings are identified by the following numbers:

| | |
|---|---|
| 10 | Earth's surface |
| 12 | Excavation |
| 14 | First main pipeline |
| 16 | Second main pipeline |
| 18 | Cross-line |
| 20 | Connection of the cross-line |
| 22 | Branch fitting |
| 24 | Flange fitting |
| 26 | Valve |
| 28 | Pig launcher |
| 30 | Pipeline pig |
| 32 | Hydraulic ram |
| 34 | Plugging machine |
| 36 | Pig signal device |
| 38 | Branch fitting |
| 40 | Flange fitting |
| 42 | Valve |
| 44 | Pig catcher |
| 46 | Hot tap machine |
| 48 | Flow-through pig guide |
| 50 | Tubular body |
| 52 | Slotted openings |
| 54 | Outer diameter |
| 56 | Locking ring flange |
| 58 | External groove |
| 60 | Branch shield pig guide |
| 62 | Tubular body portion |

-continued

| | |
|---|---|
| 64 | Lateral tubular portion |
| 66 | Locking ring flange |
| 68 | Circumferential groove |
| 70 | Short length tubular portion |
| 72 | Bars |
| 74 | Bars |
| 76 | Locking pipe plug |
| 76A | Improved locking pipe plug |
| 78 | Tightening nut |
| 80 | Ram expander |
| 82 | Shaft |
| 84 | Base member |
| 86 | Tubular portion |
| 88 | Radial flange |
| 90 | Compression member |
| 92 | Seal member |
| 94 | Actuation member |
| 96 | Cup portion |
| 98 | Frusto-conical surface |
| 100 | Segmented slips |
| 102 | Base portion |
| 104 | Bolt |
| 106 | Bolt head |
| 108 | Cross-line plugger |
| 110 | Back up plate |
| 112 | Elastomer seal |
| 114 | Attachment guide |
| 116 | Pipeline pig |
| 118 | Bypass line |
| 120 | Bypass valve |
| 126 | Retainer spring |
| 128 | External threads |
| 132 | Rotation resistor |
| 134 | Wire brush |
| 136 | Wires |
| 138 | Outer end |
| 140 | Pipe inner surface |
| 142A, B | Face plates |
| 144 | Opening |
| 146 | Bolt |
| 148 | Threaded opening |
| 150 | Holder |
| 152 | Inner end portion |
| 154 | Threaded opening |
| 156 | Interior recess |
| 158 | Pipe plug |
| 160 | Washer |
| 162 | Internal threads |
| 164 | Flange |
| 166 | Openings |

Figure 1:
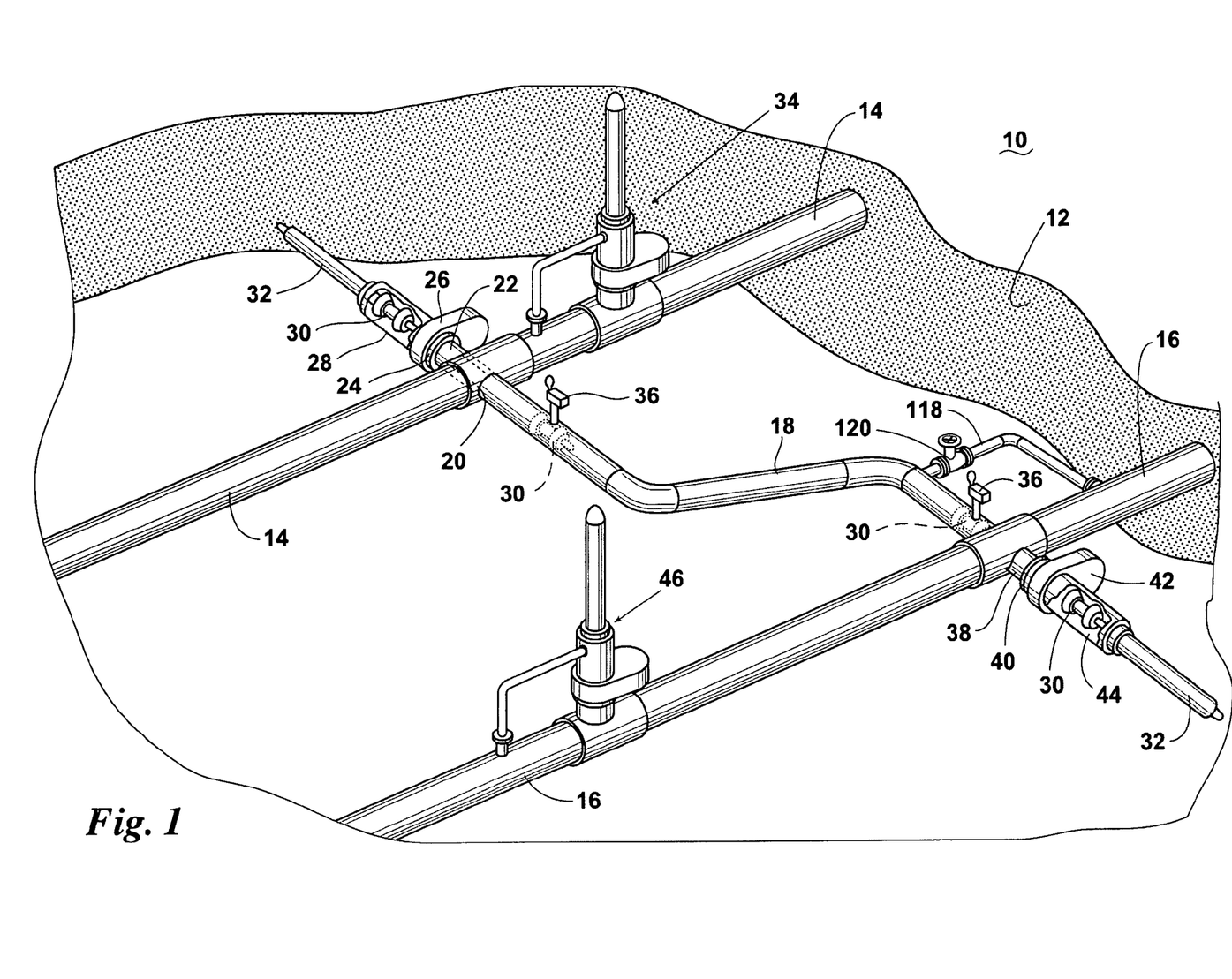
FIG. 1 is a diagrammatic, isometric view showing an excavation in the earth in an area having two main pipelines and a cross-line. This figure shows the method of this invention for providing access to the cross-line by cutting a hole in the side wall of each of the main pipelines, each hole being diametrically opposite the attachment of the cross-line.

Referring first to FIG. 1, an environment in which the principles of this invention can be practiced is illustrated. This figure shows the earth's surface 10 having an excavation 12 that reveals a first main pipeline 14, a second main pipeline 16 and a cross-line 18. This invention provides improved methods, systems and apparatuses for verifying the integrity of cross-line 18.

The first step in practicing the invention to provide access to cross-line 18 is to affix a branch fitting 22 to the exterior of primary pipeline 14 on the side thereof diametrically opposite the point of intersection 20 of cross-line 18. The term "cross-line" could equally as well be "branch pipeline" as either term is indicative of a line that extends perpendicularly from a primary pipeline. The branch fitting 22 needs to be of a diameter at least equal to the diameter of cross-line 18 but preferably is of a diameter equal to that of the main pipeline 14. Such branch fitting will typically include a flange 24 which receives the attachment of a full opening valve 26. After valve 26 has been attached, then a hot tap machine (not shown) is secured to the valve. The use of hot tapping machines to provide access to the interior of a pipeline is well known in the industry. For specific teachings of the construction, operation and methods of use of hot tapping machines, reference may be had to the following United States Patents:

U.S. Pat. No. 4,579,484 entitled "Underwater Tapping Machine"; and

U.S. Pat. No. 5,439,331 entitled "High Pressure Tapping Apparatus", that have been previously identified.

By use of a hot tapping machine a shell cutter (not shown) is extended through valve 26, flange 24 and branch fitting 22 to engage the exterior sidewall of main pipeline 14 so that an opening is cut in the side wall of main pipeline 14. The opening is diametrically opposite the connection 20 of cross-line 18 to the main pipeline 14.

After such large diameter opening is cut in the side wall of main pipeline 14, the piece cut out of the pipeline is removed through valve 26. Valve 26 can then be closed and the hot tapping machine (not shown) can be removed and in place of the hot tapping machine, a pig launcher 28 is attached to valve 26. Pig launchers are well known in the pipeline industry. Essentially a pig launcher is a device that permits, at atmospheric pressures, a pipeline pig such as the pipeline pig 30 illustrated in FIG. 1, to be positioned within the launcher. The pig launcher is then hermetically sealed. Valve 26 can then be opened and by means such as a hydraulic ram 32, pipeline pig 30 can be pushed out of pig launcher 28, through valve 26 and branch fitting 22, and diametrically through main pipeline 14 into the interior of cross-line 18. By force of fluid flow, either liquids or gases, the pig can then be caused to move through cross-line 18. In FIG. 1, a pipeline pig 30 is indicated by dotted outline as moving through cross-line 18.

In order to ensure the passage of a pig 30 through cross-line 18, increased fluid flow pressure can be obtained by temporarily closing or at least partially closing main pipeline 14. For this purpose, a plugging machine generally indicated by the numeral 34 can be affixed to pipeline 14 downstream of the cross-line connection. A plugging machine which functions as previously described can provide an opening into the interior of main pipeline 14 through which a flow blockage apparatus (not shown) can be inserted for temporarily blocking or at least reducing fluid flow through the main pipeline. Such flow blockage mechanism is well known in the pipeline industry and is commercially available from T. D. Williamson, Inc. of Tulsa, Okla., U.S.A.

With fluid flow blocked or at least restricted by way of a plugging machine 34 and the insertion of a flow blockage mechanism, the pipeline pig 30 will be forced through the interior of cross-line 18. The pig 30 may be of any type that is currently used in the industry including geometrical measurement pigs, cleaning pigs, corrosion measurement pigs and so forth. Movement through cross-line 18 of the pig can be verified by the use of pig signaling devices 36 that are attached to the exterior of cross-line 18. Two such pig signaling devices are shown in FIG. 1.

In FIG. 1 a second branch fitting 38 is shown as having been attached to second main pipeline 16 opposite the connection of cross-line 18. As with first pipeline 14, after the branch fitting 18 is attached with a flange 40, a valve 42 is employed. By accessing the exterior surface of main pipeline 18 through valve 42, a hot tapping machine (not shown) may be employed to provide an opening in the wall of second main pipeline 16. After such opening is provided, the hot tapping machine is removed and a pig catcher 44 can be installed. In this way, after the pipeline pig 30 has traversed through cross-line 18 to perform any of the functions that are commonly available by the use of a pipeline pig, the pig is captured within catcher 44 and may be removed.

As has been described, to augment fluid flow pressure through cross-line 18 to cause pig 30 to move therethrough, it may be desirable to block the fluid flow that normally occurs within second main pipeline 16 and for this reason, a hot tap machine can be employed so as to provide an opening into the interior of second main pipeline 16 and the insertion of flow blockage equipment with a plugging machine to temporarily block or restrict fluid flow. Thus with flow blocked or restricted downstream of the cross-line in first main pipeline 14 and blocked or restricted upstream of the cross-line in second main pipeline 16, fluid flow pressure through cross-line 18 is optimized to ensure movement of pipeline pig 30 through it and into position for retrieval.

Figure 2:
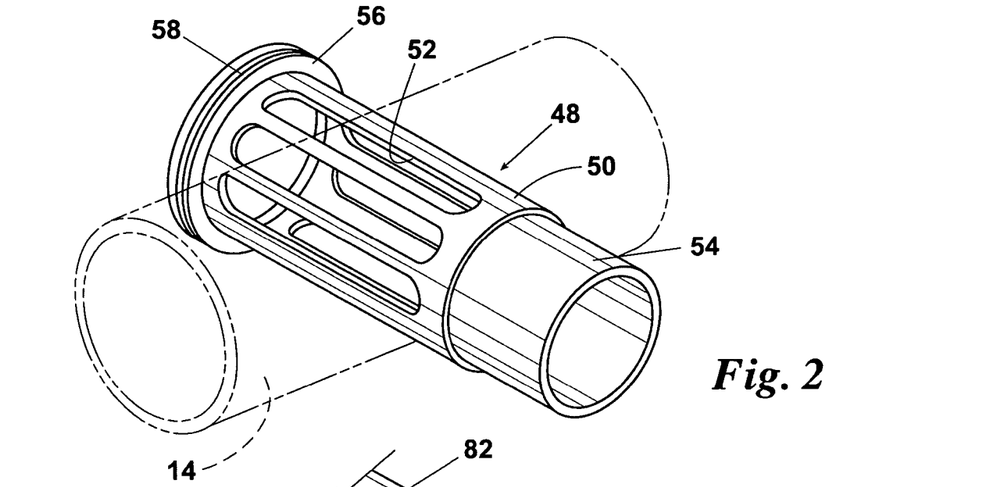
FIG. 2 is an isometric view showing a main pipeline in dotted outline and showing, in solid line, a flow-through pig guide that is temporarily inserted through a main pipeline when a pig is being launched into the cross-line.

After the opening through the side wall of first pipeline 14 has been accomplished as described, it is important that provisions be made so that when pipeline pig 30 is injected diametrically through the main pipeline that the pig will pass into cross-line 18 and not become lodged within the main pipeline. For this reason, a flow-through pig guide as generally indicated by the numeral 48 is employed. The flow-through pig guide is illustrated in FIG. 2. Flow-through pig guide 48 is inserted diametrically through first main pipeline 14 that is illustrated in dotted outline in FIG. 2, the flow-through pig guide 48 passing through valve 26. Flow-through pig guide 48 has a tubular body 50 with slotted openings 52 therein. The outer end portion 54 is of external diameter so that it can extend telescopically within the interior of cross-line 18.

The inner end of flow-through pig guide 48 has a locking ring flange 56 with an external circumferential groove 58 therein. Flange fittings 24 and 40, as previously identified, are preferably of the type that facilitate receiving an internal device and removably locking it in place. Such a device is illustrated and described in detail in U.S. Pat. No. 3,766,947 entitled "Fluid-Type Closure", issued Oct. 23, 1973. This patent teaches a type of flange that has provisions for actuation of a plurality of locking elements that can be moved radially inwardly or radially outwardly by adjustment of screw mechanisms on the exterior of the flange (not shown in FIG. 1). These locking elements are moved into external circumferential groove 58 to thereby hold flow-through pig guide 48 in position as it extends diametrically through pipeline 14.

The use of the flow-through pig guide ensures, as above indicated, the passage of a pig 30 through the main pipeline 14 so that the pig passes into cross-line 18. In the same manner, a flow-through pig guide as illustrated in FIG. 2 is positioned diametrically within second pipeline 16 in which case the flange 40 (as seen in FIG. 1) is of the type that has locking elements that can be extended into and withdrawn from the circumferential groove 58.

The flow-through pig guide 48 of FIG. 2 is used only when a pig is being launched into or received diametrically through main pipeline 14 or 16 and thereafter removed since if left in position they would interfere with the passage of pigs through the main pipelines.

Figure 3:
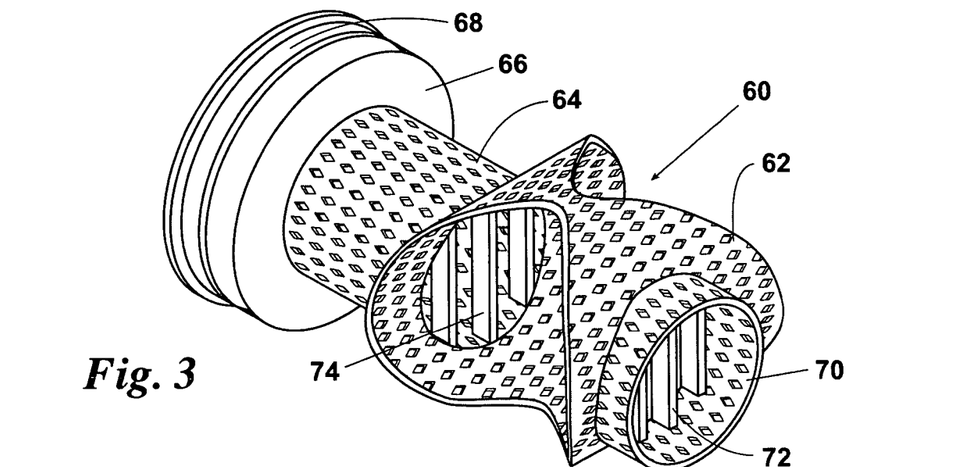
FIG. 3 is an isometric view of a branch shield pig guide that can be inserted into a main pipeline after access has been provided to a cross-line to restore pigability of the main pipeline. That is, the branch shield pig guide is used to ensure that a pig passing through a main pipeline is not inadvertently diverted into a cross-line.

After the method of this invention has been employed as has been described to provide access diametrically through main pipelines 14 and 16 and after pigging operations or other work required to be done on cross-line 18 has been completed, it is important that the main pipelines 14 and 16 be restored to function in the manner as if such work on the cross-line had not been done. That is, it is important that the provision of the openings through the walls of main pipelines 14 and 16 do not interfere with the passage of pipeline pigs through them. For this purpose, after the work on the cross-line 18 has been completed, a branch shield pig guide generally indicated by the numeral 60 as shown in FIG. 3, can then be installed within the main pipelines 14 and 16. The branch shield pig guide includes a main short length tubular body portion 62 that is of external dimensions slightly less than the internal diameter of main pipeline 14. Extending from tubular body portion 62 is a lateral tubular portion 64 that connects the main body portion to a locking ring flange 66 that has a circumferential groove 68. Thus, by use of a locking ring system as illustrated and described in U.S. Pat. No. 3,766,947 as previously mentioned, the branch shield pig guide 60 can be maintained within the interior of main pipeline 14.

Extending from the tubular body portion 62 is a short length tubular portion 70 of external diameter substantially equal to the interior diameter of cross-line 18. When positioned within the interior of main pipeline 14, the short length tubular portion 70 extends telescopically within the cross-line to assist in anchoring the branch shield pig guide 60 in position. To prevent the possibility of a pig passing through main pipeline 14 attempting to enter cross-line 18, paralleled bars 72 close tubular portion 70. Similar bars 74 are shown closing the lateral tubular portion 64 for similar reasons, that is, to close off the possibility of a pig attempting to enter this passageway. The use of bars 74 is optional since there is no fluid flow through this lateral tubular passageway that would tend to cause a pig to enter it whereas fluid flow through the short length tubular portion 70 is possible.

The branch shield pig guide 60 is installed through valve 26 as previously described by means of a hot tapping machine so that such device can be installed while the main pipeline 14 is under pressure. Branch shield pig guide 60 includes a flange closure system 66 to close off flange 24 enabling valve 26 to be removed and a blind flange (not shown) installed.

A branch shield pig guide 60 will also be installed in second main pipeline 16 for the same reasons as described with reference to the first main pipeline 14.

Figure 4:
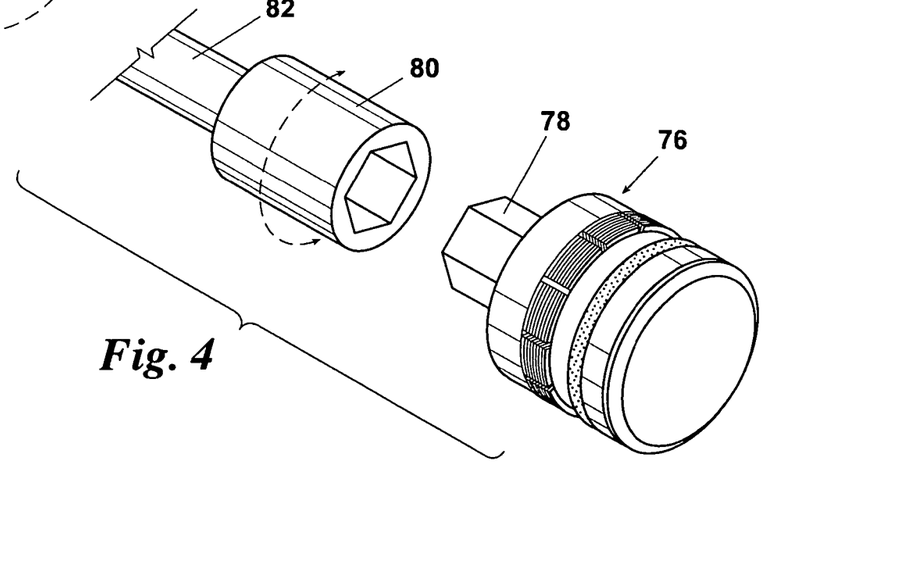
FIG. 4 is an exploded view of a locking pipe plug that can be used for closing the interior of a cross-line and showing a tool that is used for the installation of the locking pipe plug.
Figure 5:
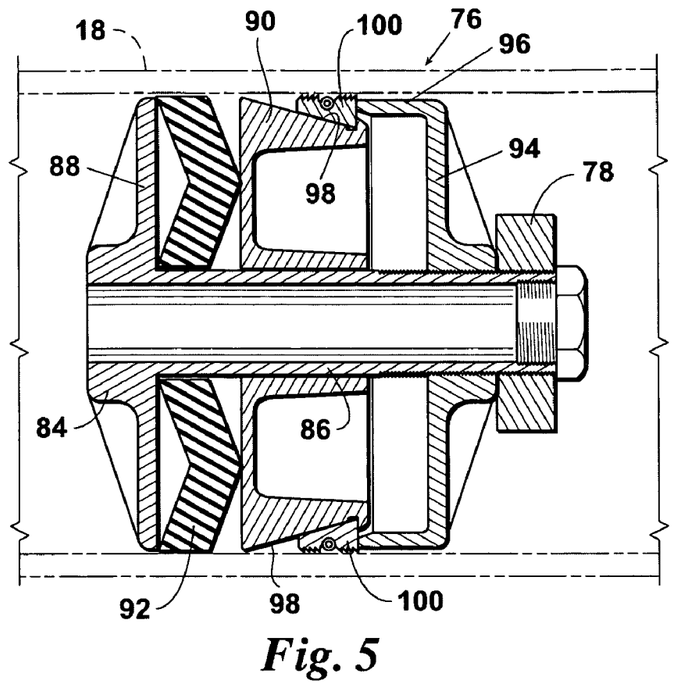
FIG. 5 is a cross-sectional view of a locking pipe plug of the type shown in FIG. 4. In this view the locking pipe plug is in the non-expanded condition as when it is being inserted into or removed from the interior of the cross-line.
Figure 6:
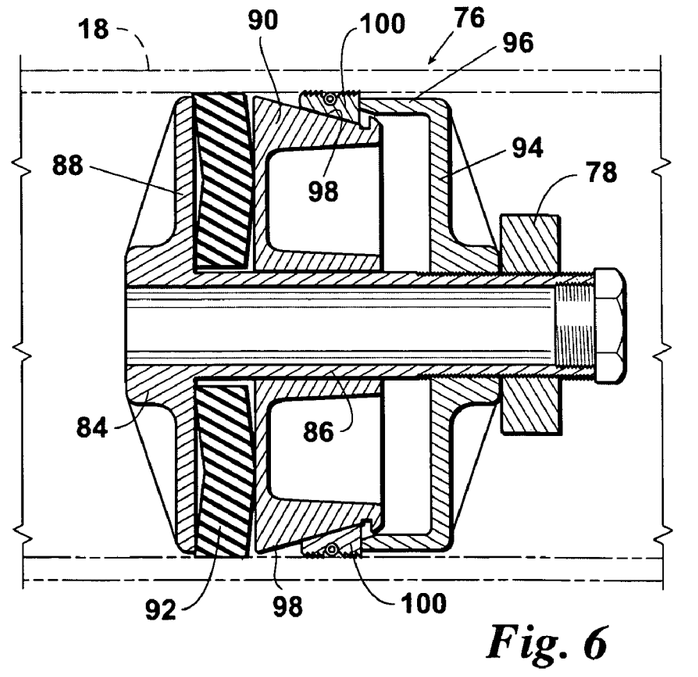
FIG. 6 shows the locking pipe plug of FIGS. 4 and 5 after having been actuated to a secure position within the interior of the cross-line in a manner to provide leak proof closure of the cross-line.

After access to cross-line 18 is provided diametrically through main pipelines 14 and 16, it is then possible to seal off both ends of the cross-line 18 to allow for pressure testing, as is sometimes required to ensure the integrity of the cross-line. For this purpose, a locking pipe plug 76 as generally indicated in FIG. 4 and in greater detail in FIGS. 5 and 6 is employed. As shown in FIG. 4 the locking pipe plug 76 has, on the rearward end thereof, a tightening nut 78 that can be grasped by a ram expander 80 that is positioned and rotated by a shaft 82. By means of hot tapping equipment that controls the axial and rotational position of ram expander 80, it can be extended diametrically through the interiors of both main pipeline 14 and 16. In this way a locking pipe plug 76 can be inserted in each end of cross-line 18.

The details of the locking pipe plug are shown in FIG. 5. A base member 84 has a tubular portion 86 that is externally threaded and receives nut 78 thereon. The base portion 84 has an integral radial flange portion 88 that faces a radial compression member 90 that is slidable on tubular portion 86. Between radial flange portion 88 and compression member 90 is a circumferential elastomeric seal member 92. In the relaxed position as shown in FIG. 5 the seal member is cupped outwardly as indicated in the cross-sectional view. Received on tubular portion 86 is an actuation member 94 having a cupped portion 96. The compression member 90 has a frusto-conical surface 98 that receives segmented slips 100.

When nut 78 is threadably tightened by rotation of shaft 82 and thereby ram expander 80 as seen in FIG. 4, the threaded advancement of nut 78 towards base member 84 moves compression member 90 towards base member radial flange 88, compressing seal member 92. The segmented slips 100 are concurrently moved forward and the reaction of the slips with frusto-conical surface 98 causes the slips to expand radially outwardly for engagement with the interior of cross-line 18.

In this way the locking pipe plug 76 is tightly engaged within the interior of cross-line 18. With a locking pipe plug at each end of the cross-line, pressure can be applied to it to test for leakage. High pressure can be applied to test the bursting strength of cross-line 18.

After such tests are completed, each locking pipe plug can be removed by reversing the rotation of nut 78, and retrieving the plug with expander 80 as affixed to shaft 82.

Figure 7:
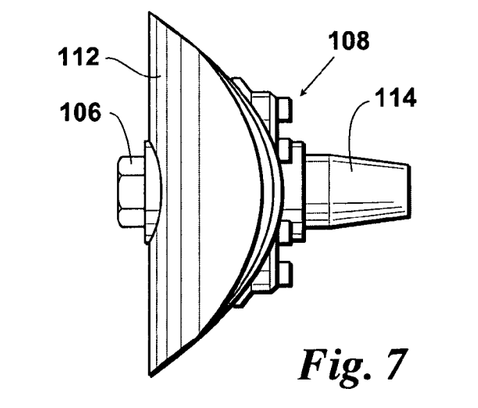
FIG. 7 is a side view of the cross-line plugger that can be used to close off the opening in a main pipeline where communication is provided with a cross-line.
Figure 8:
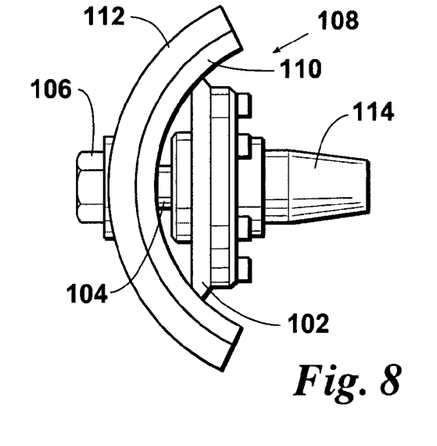
FIG. 8 is a side view of the cross-line plugger rotated 90° with respect to FIG. 7.
Figure 9:
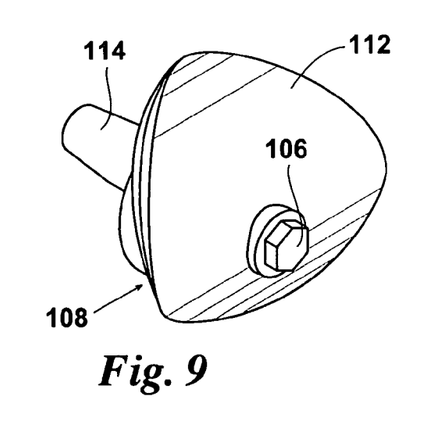
FIG. 9 is an isometric view of a cross-line plugger of FIGS. 7 and 8.
Figure 10:
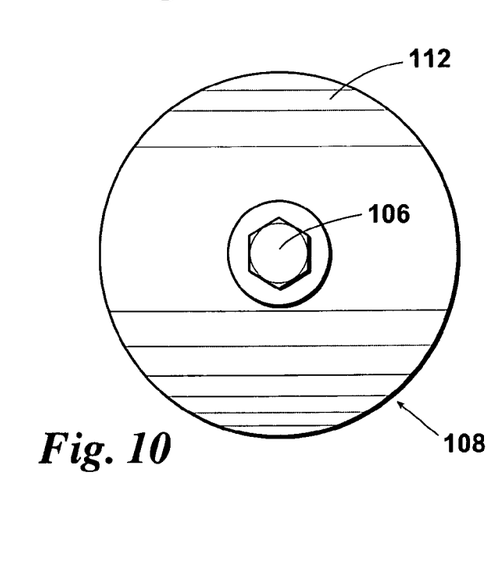
FIG. 10 is an elevational front view of the cross-line plugger of FIGS. 7, 8 and 9.
Figure 11:
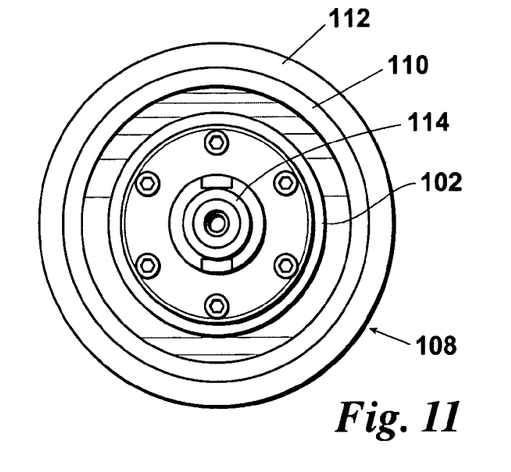
FIG. 11 is an elevational rear view of the cross-line plugger of FIGS. 7, 8, 9 and 10.

Another way of closing off the opposed ends of cross-line 18 is by the use of a cross-line plugger 108 as shown in FIGS. 7 through 111. This item has a base portion 102 with a bolt 104 having a head 106 that forms the forward end of the cross-line plugger, which is generally indicated by the numeral 108. Bolt 104 receives an arcuate back up plate 110 having an elastomer seal 112 on the forward surface thereof. The radius of curvature of the back up plate 110 and the forward surface of elastomer seal 112 is the same radius of curvature as the interior circumferential surface of the main pipelines 14 and 16. The rearward end of the cross-line plugger 108 is an attachment guide 114.

The cross-line plugger 108 is used in this way: with an opening having been formed in 110 each of the main pipelines 14 and 16, each ends of cross-line 18 can be temporarily closed by inserting through each open valves 26 and 42, a cross-line plugger 108 attached to a rod (not shown) extending from hydraulic cylinder 32. Cross-line plugger 108 passes diametrically through a main pipeline. The elastomer seal 112 of each plugger engages the circumferential area of the internal cylindrical wall of a main pipeline that surrounds the opening communicating with cross-line 18. In this way the cross-line is plugged off at each end. It should be kept in mind that the cross-line plugger 108 is not intended for use to resist high pressure within cross-line 18 but cross-line pluggers 108 may be used to isolate the cross-line from the main pipelines and permit drainage of liquids and gases from it so as to permit repairs. The cross-line pluggers are not intended for permanently closing the cross-line.

Figure 12:
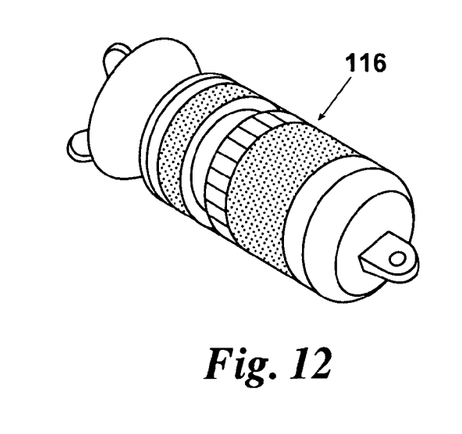
FIG. 12 is an isometric view of a typical instrument pipeline pig, shown in small scale, that can be launched into the cross-line after the methods of this invention are employed to provide access diametrically through main pipelines to which the cross-line connects.

FIG. 12 is a small scale isometric representation of a pipeline pig 116 which may be of the type used for determining the structural integrity of cross-line 18. Pigs 116 of the type shown in FIG. 12 may include highly technical systems such as for measurement of corrosion by magnetic flux leakage, or sonic energy reflections.

FIG. 1 illustrates an additional element that is not directly related to the methods and systems of this invention but that make the inventions herein more useful. Extending from cross-line 18 is a bypass line 118 that connects to second main pipeline 16 downstream of branch fitting 38. A bypass valve 120 controls flow through bypass line 118. When a pig 30 is launched through branch fitting 22 and diametrically through first main pipeline 14, valve 120 is opened. When pipeline pig 30 gets to near the end of cross-line 18 as shown in dotted outline in FIG. 1, the restriction to fluid flow imposed by the pipeline pig will cause fluid flow through bypass line 118, stopping further movement of the pipeline pig which is then in position for retrieval by apparatus extending from pig catcher 44. When a pig is not being received bypass valve 120 will normally be closed.

Figure 13:
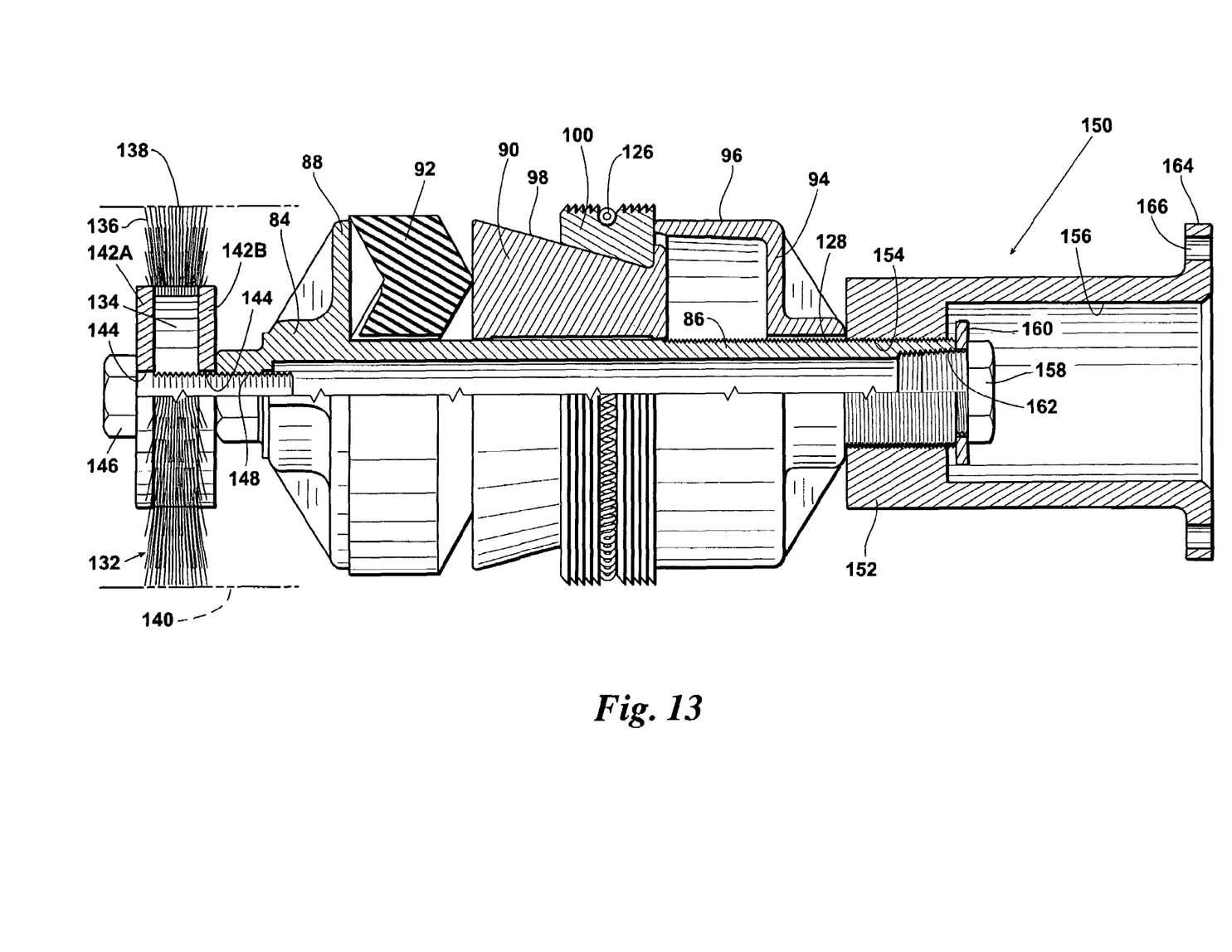
FIG. 13 is an elevational view, shown partially in cross-section, of an improved locking pipe plug of the type shown in FIGS. 5 and 6. The improved locking pipe plug includes, among other advantages, a rotation resistor.

FIG. 13 illustrates in elevational view, shown partially in cross-section, an improved locking pipe plug generally indicated by the numeral 76A. The improved locking pipe plug employs the basic concepts of the locking pipe plug illustrated and described with reference to FIGS. 5 and 6 and the components in the improved locking pipe plug 76A that have the similar structure and function to the components in FIGS. 5 and 6 are provided with the same numbers.

Thus, the embodiment of FIG. 13, as compared with the embodiment of FIGS. 5 and 6, has these similar functioning components: a base member 84 with a tubular portion 86 and a radial flange 88; an expansion member 90; an elastomeric seal member 92; an actuation member 94 having a cup portion 96; and a frusto-conical surface 98 on compression member 90 that receives segmented slips 100. In addition to the similarities in the locking pipe plug illustrated in FIGS. 5 and 6 and that of FIG. 13, FIG. 13 shows additional features and improvements.

As has been previously described, segmented slips 100 are formed of metal to securely lock into the interior wall of the pipe in which the improved locking pipe plug 76A is positioned. A retainer spring 126 encircles the segments making up segmented slips 100 to hold them in contact with frusto-conical surface 98 of compression member 100.

Actuation member 94 is received slideably on the external threads 128 of tubular portion 86 of base member 84. When the improved pipe plug 76A is inserted into a pipe, rotation of holder 150, with its internal threads 154 engaged in the external threads 128 on tubular portion 86, causes actuation member 94 to be axially advanced so that it moves the cup portion 96 against segment slips 100 to thereby force compression member 90 in the direction towards radial flange 88. This causes radially expansion of segmented slips 100 and simultaneously axially advances compression member 90 towards flange 88, thereby compressing seal member 92. Thus, threadably rotating holder 150 simultaneously causes segmented slips 100 to lock against the interior surface of the pipe in which the plug is positioned and to radially expand the seal member 92 to seal against the wall of the pipe in which the plug is positioned.

When holder 150 is rotated to set the locking pipe plug it is necessary that the pipe plug itself not rotate, that is, there must take place threading action between the internal threads of holder 150 and external threads 128 on the base member tubular portion 86. Stating it another way, it is important that the base member 84 be restrained from rotation so that actuation member 94 can be slideably advanced, through rotation of holder 150, to actuate segmented slips 100 and seal member 92. The embodiment of the improved locking plug 76A of FIG. 13 includes an innovative system of restraining rotation of the base member 84 so as to permit locking a plug in position.

When the improved locking pipe plug 76A is inserted into a pipeline, it is necessary to rotate holder 150 relative to base member 84 to threadably advance it and thus slideably advance the actuation member 94 so that the cup portion 96 presses against slips 100 to start the process of locking the pipe plug within the pipe. Thus it is helpful if a system is provided for resisting the rotation of base member 84 especially during the initial process of tightening holder 150 on the actuation member tubular portion 86. For this purpose, the improved locking pipe plug 76A includes a rotation resistor generally indicated by the numeral 132. In FIG. 13, a preferred embodiment of a rotation resistor 132 is illustrated and is in the form of a stiff cleaning brush assembly commonly used on pipeline cleaning pigs. An alternative embodiment is essentially of a cylindrical wire brush that is of the type readily commercially available and that is typically used as a part of a rotating mechanism for cleaning the surface of metallic objects. Thus in the illustrated embodiment, the rotation resistor 132 is a wire brush 134 that provides a large number of radially extending flexible wires 136. Each of the wires 136 has an outer free end 138 arranged so that the length of the wires 136 extends the outer ends thereof 138 beyond the normal diameter of the pipe in which the plug is to be used.

That is, the wires 136 are of sufficient lengths so that the outer ends 138 thereof flexibly engage the pipe inner surface 140.

Wire brush 134 typically includes opposed face plates 142A and 142B that retain the wires 136 therebetween. Face plates 142A and 142B each have a central opening 144 therein that receives a bolt 146. Bolt 146 is received in a threaded opening 148 in base member 84. Thus the rotation resistor 132 is rotatably locked to base member 84.

When the improved locking pipe plug 76A is inserted into a pipe to plug the interior of the pipe against fluid flow therethrough, the wires 136 of the wire brush flex or bend so that the pipe plug is relatively easily inserted into the pipe. The wire ends 138 engage the internal surface 140 of the pipe and resist the rotation of the base member 84. It is to be emphasized that the wire brush 134 does not lock the plug base member 84 against rotation but merely resists rotation. All that is required is that rotational resistance be applied to the base member 84 as the holder 150 is rotated to threadably advance actuation member 94 slideably on tubular portion 86. As the actuation member 94 advances, segmented slips 100 engage the pipe interior surface and immediately serve to resist rotation of the pipe plug. As the advance of the base member 84 continues compressive force is applied against seal member 92 so the outer circumferential surface thereof expands to engage the interior of the pipe to further resist rotation. Thus it can be seen that after actuation member 94 is advanced, the segmented slip 100 and seal member 92 themselves begin to lock the pipe plug against rotation. After this action takes place the rotational resistance applied by rotation resistor 132 is no longer required. Therefore, the function of wire brush 134 is to merely resist rotation to get the process of anchoring the pipe plug in the pipe started. In the same manner, when it is necessary to remove the pipe plug, as the holder 150 is threadably retracted, the contact of segmented slips 100 and seal member 92 with the pipe interior surface gradually decreases and the rotational resistor 132 takes over to allow the actuation member 94 to be retracted to the point that the plug can be axially extracted from the pipe.

Another element illustrated in FIG. 13 that is not shown in FIGS. 5 and 6 is a holder generally indicated by the numeral 150. Holder 150 is tubular with an inner end portion 152 having an internally threaded opening 154 therein. The forward portion of holder 150 is tubular providing an interior recess 156 that receives a threaded pipe plug 158. Internally pipe threads 162 at the outer end of the base member tubular portion 86 threadably and sealably receives pipe plug 158. A washer 160 has an outer diameter greater than the diameter of holder threaded opening 154. Thus after holder 150 is threaded onto the outer end of tubular portion 86, pipe plug 158 and washer 160 may be secured in position to prevent holder 150 from being inadvertently unthreaded from base member tubular portion 86.

The outer end of holder 150 has a radial flange 164 with openings 166 therein. Bolts extending through openings 166 (not shown) can be used to hold locking pipe plug 76A, for inserting it into a pipe and correspondingly for removing it after a plug has been inserted, onto shaft 82 of an insertion tool or onto a tapping machine 46 of the type as commonly employed in piping technology and that is readily commercially available from T.D. Williamson, Inc. of Tulsa, Okla.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. For use in closing the internal cylindrical sidewall of a pipe, a locking pipe plug, comprising:
    a base member having a radial flange portion of diameter less than that of the cylindrical sidewall and an integral co-axial tubular portion;
    an annular elastomeric seal member having a circumferential sealing surface and a central opening slideably received on said base member tubular portion and in engagement with said flange portion;
    a circular rigid compression member having a central opening slideably received on said base member tubular portion, having a radial face in contact with said elastomeric member and having a frusto-conical circumferential surface extending in the direction away from said radial face;
    a plurality of rigid segmented slips circumferential received on said compression member frusto-conical surface and having teeth for biting into the cylindrical sidewall, the segmented slips being radially outwardly displaceable when slideably displaced on said frusto-conical surface;
    an actuation member slideably received on said base member tubular portion providing an end surface in engagement with said segmented slips; and
    a tightening nut threadably received on a threaded end portion of said base member tubular portion that can be threadably tightened to cause said segmented slips and said circumferential sealing surface to be outwardly displaced to lock the pipe plug in position and to sealably close the pipe cylindrical sidewall.

2. A locking pipe plug according to claim 1 wherein said plurality of rigid segmented slips are slideably retained on said compression member frusto-conical surface by a circumferential retainer spring.

3. A locking pipe plug according to claim 1 wherein said compression member has an end surface in contact with said seal member whereby axial displacement of said compression member radially expand said circumferential sealing surface of said elastomeric member.

4. A locking pipe plug according to claim 1 wherein said elastomeric member is V-shaped in cross-section to thereby augment the radial expansion of said circumferential sealing surface when the elastomeric member is axially compressed.

5. A locking pipe plug according to claim 1 wherein said tightening nut has at a forward end thereof a radially extending flange portion for use when the locking pipe plug is positioned into or removed from a pipe using an actuator or tapping machine.

6. A locking pipe plug according to claim 1 including a rotation resistor affixed to said base member and configured to engage the internal cylindrical sidewall of a pipe in which the pipe plug is positioned.

7. A locking pipe plug according to claim 6 wherein said rotation resistor is in the form of a wire brush having radially extending wires that engage the internal cylindrical sidewall of a pipe in which the pipe plug is positioned.

8. A locking pipe plug according to claim 5 wherein said tightening nut is elongated, having an internally threaded opening in a forward end to engage said threaded end portion of said base member tubular portion and has a recess in a rearward end terminating in said radially extending flange portion and wherein said base member tubular portion is internally threaded at the outer end thereof and including a pipe plug and washer positioned within said tightening nut recess, the pipe plug being threaded into said base member tubular portion, the pipe plug and washer thereby retaining said tightening nut onto said base member tubular portion.

* * * * *